United States Patent
Guo et al.

(10) Patent No.: US 9,585,519 B2
(45) Date of Patent: Mar. 7, 2017

(54) STIRRING BLADE

(71) Applicant: GUANGDONG XINBAO ELECTRIC JOINT-STOCK LTD., Guangdong (CN)

(72) Inventors: Jiangang Guo, Guangdong (CN); Dingguo Peng, Guangdong (CN); Dingxun Sheng, Guangdong (CN)

(73) Assignee: GUANGDONG XINBAO ELECTRIC JOINT-STOCK LTD., Guangdong (CN)

( * ) Notice: Subject to any disclaimer, the term of this patent is extended or adjusted under 35 U.S.C. 154(b) by 371 days.

(21) Appl. No.: 14/253,229

(22) Filed: Apr. 15, 2014

(65) Prior Publication Data
US 2015/0289722 A1    Oct. 15, 2015

(51) Int. Cl.
*A47J 43/00*   (2006.01)
*A47J 43/07*   (2006.01)

(52) U.S. Cl.
CPC ....... *A47J 43/0722* (2013.01); *A47J 43/0711* (2013.01)

(58) Field of Classification Search
CPC .... A47J 43/0722; A47J 43/07; A47J 43/0416; A47J 43/22; A47J 43/0711
USPC .......................................... 241/282.2, 292.1
See application file for complete search history.

(56) References Cited

U.S. PATENT DOCUMENTS

| | | | |
|---|---|---|---|
| 3,871,590 A * | 3/1975 | Steffens | B02C 18/20 241/282.2 |
| 5,090,093 A * | 2/1992 | Kelly | B02C 23/10 241/101.2 |
| 5,823,672 A * | 10/1998 | Barker | A47J 43/0722 241/282.2 |
| 6,834,818 B2 * | 12/2004 | Lee | A47J 43/0722 241/282.2 |
| 7,677,485 B2 * | 3/2010 | Gursel | A47J 43/0722 241/282.1 |
| 7,905,438 B2 * | 3/2011 | Holcomb | A47J 43/07 241/282.2 |
| 8,690,093 B2 * | 4/2014 | Rukavina | A47J 43/0722 241/282.2 |
| 2006/0231656 A1 * | 10/2006 | Lee | A23L 1/304 241/282.2 |

* cited by examiner

*Primary Examiner* — Faye Francis
(74) *Attorney, Agent, or Firm* — Muncy, Geissler, Olds & Lowe, P.C.

(57) ABSTRACT

A stirring blade includes an upper blade assembly and a lower blade assembly. The upper blade assembly includes a first four-edged blade and an upper blade carrier to which the first four-edged blade is fixed, and the lower blade assembly includes a second four-edged blade and a lower blade carrier to which the second four-edged blade is fixed. The upper blade carrier is connected to the lower blade carrier by a detachable connecting structure.

6 Claims, 3 Drawing Sheets

PRIOR ART

STIRRING BLADE

FIELD OF THE INVENTION

The present invention relates to a stirring blade and, in particular, to a stirring blade for food processors, classified as an improved technology of stirring blade for food processors.

BACKGROUND OF THE INVENTION

Existing stirring blades for food processors comprise single-layer stirring blades and double-layer stirring blades. As shown in FIG. 1, the single-layer stirring blade consists of a two-edged blade 2 and a blade carrier 1 to which the two-edged blade 2 is fixed. The single-layer stirring blade has poor effect and inefficiency in stirring, and is incapable of cutting some large pieces of food. There are two types of double-layer stirring blades. As shown in FIG. 2, one type consists of two single-layer stirring blades superimposed on each other, which are formed by two-edged blades 2 respectively fixed to an upper blade carrier 1 and a lower blade carrier 4, and cannot be disconnected. As shown in FIG. 3, another type consists of a single-layer stirring blade and a four-edged stirring blade movably combined with each other, the four-edged stirring blade consisting of a four-edged blade 1 and an upper blade carrier 2 to which the four-edged blade 1 is fixed, and the single-layer stirring blade consisting of a two-edged blade 4 and a lower blade carrier 3 to which the two-edged blade 4 is fixed. The four-edged stirring blade is able to be disassembled from the single-layer stirring blade. The double-layer stirring blade has better stirring effect compared to the single-layer stirring blade. However, some large pieces of food between the two layers of stirring blades can't be reached, thus the efficiency is relatively low and the cutting is uneven.

SUMMARY OF THE INVENTION

Based on the above problems, one object of the present invention is to provide a stirring blade that allows the food to be cut from a plurality of directions, so as to improve the efficiency and the effect of cutting food, without any large pieces of food uncut. The present invention has a simple structure and a good energy saving effect and is convenient for assembly and use.

To achieve the object, a stirring blade is provided comprising an upper blade assembly and a lower blade assembly. The upper blade assembly comprises a first four-edged blade and an upper blade carrier to which the first four-edged blade is fixed, and the lower blade assembly comprises a second four-edged blade and an lower blade carrier to which the second four-edged blade is fixed. The upper blade carrier is connected to the lower blade carrier by a detachable connecting structure.

In one embodiment, the upper blade carrier is provided with a through hole, and the inner wall of the through hole is provided with a positioning groove. The lower blade carrier is a shaft-shaped structure, and the outer sidewall of the lower blade carrier is provided with a positioning pin. The upper end of the lower blade carrier is inserted into the through hole provided on the upper blade carrier, such that the positioning pin provided on the lower blade carrier is positioned by cooperating with the positioning groove provided on the upper blade carrier.

In another embodiment, the first four-edged blade comprises a upper blade, a lower blade, a left blade, a right blade, and a blade carrier. The upper blade and the lower blade are respectively provided at opposite sides of the blade carrier, and respectively located at the upper side and the lower side of the blade carrier. The left blade and the right blade are respectively provided at another opposite sides of the blade carrier. Moreover, the edges of the left blade and/or the right blade, and the edges of the upper blade and/or the lower blade, are not in the same plane. The second four-edged blade is of the same structure with the first four-edged blade.

In another embodiment, the upper blade, the blade carrier, and the lower blade are formed as a Z-shaped structure.

In another embodiment, the left blade and the right blade extend upward or downward.

In another embodiment, the joint formed by the left blade and the blade carrier, the joint formed by the right blade and the blade carrier, and the joint formed by the upper blade and the blade carrier are in the same plane.

Alternatively, the joint formed by the left blade and the blade carrier, the joint formed by the right blade and the blade carrier, and the joint formed by the lower blade and the blade carrier are in the same plane.

Since each layer of the double-layer stirring blade is provided with a four-edged blade, the stirring blade of the present invention has at least two more cutting lines than the existing stirring blade, allowing it to cut food in a plurality of directions, so as to improve the efficiency and the effect of cutting food, without any large pieces of food uncut.

Further, the upper blade assembly is movably connected with the lower blade assembly by the through hole of the upper blade carrier, and is positioned by the positioning groove of the upper blade carrier and the positioning pin of the lower blade carrier, so as to form a certain angle between each of the blades, to further improve the above effects.

Furthermore, the upper blade carrier and the lower blade carrier in the present invention are installed separately, such that the food can be stirred either by a single layer of blades or by two layers of blades. If in the present invention only the lower blade assembly is used to stir the food, it has a better stirring effect compared to similar stirring blade because of the structure of the four-edged blade as well. In general, the present invention is cleverly designed with excellent performance and convenient and practical.

BRIEF DESCRIPTION OF THE DRAWINGS

Further advantages and details of the present invention emerge from the example embodiments described below, which do not limit the invention in any way, and from the drawings, in which FIG. 1 schematically shows a single-layer stirring blade in prior art.

Elements that are irrelevant to the spirit of the present invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

EXAMPLE 1

Figure 1:
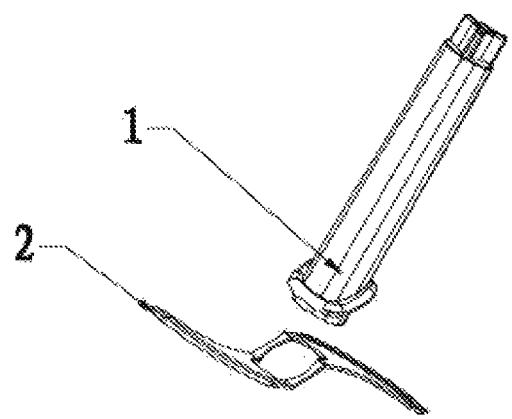
Figure 2:
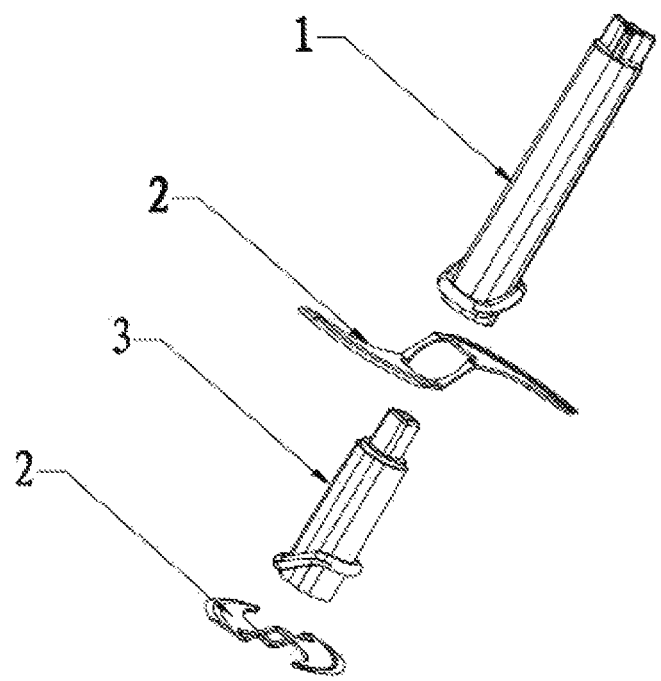
FIG. 2 schematically shows a double-layer stirring blade in prior art (fixed).
Figure 3:
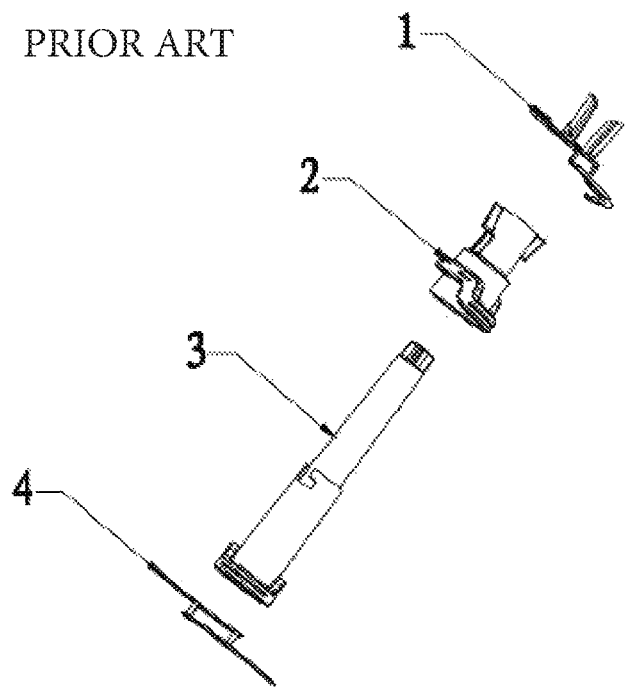
FIG. 3 schematically shows a double-layer stirring blade in prior art (movable).
Figure 4:
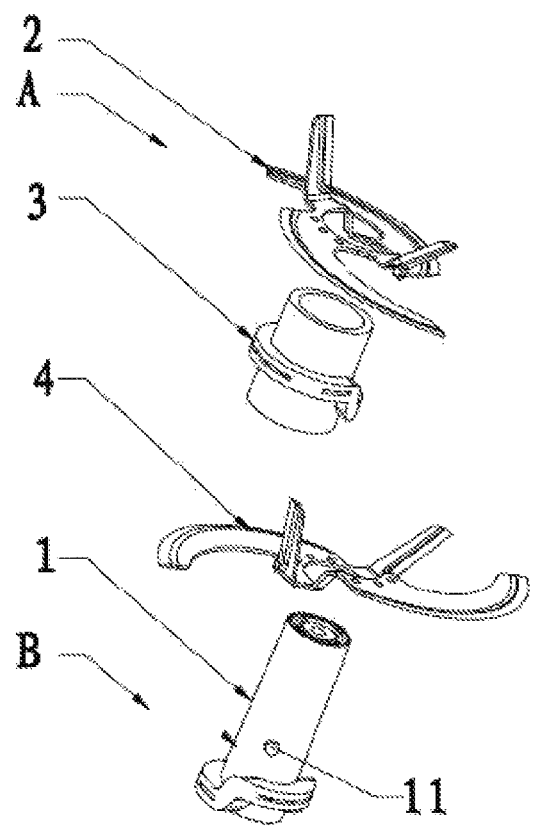
FIG. 4 schematically shows a stirring blade according to the present invention.
Figure 5:
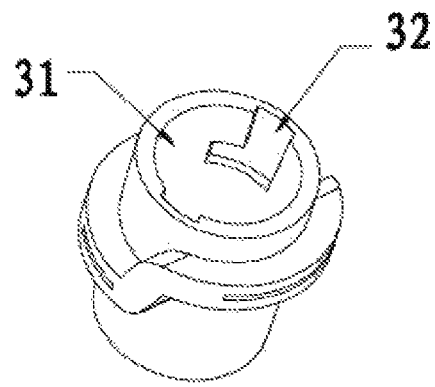
FIG. 5 schematically shows an upper blade carrier according to the present invention.
Figure 6:
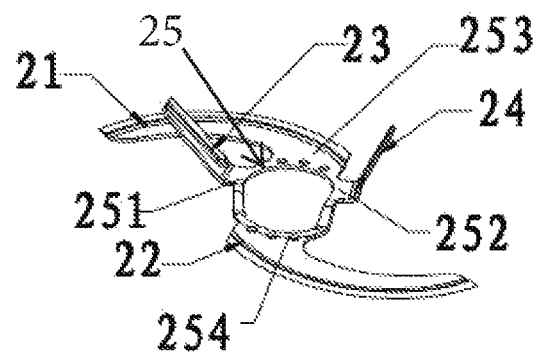
FIG. 6 schematically shows a four-edged blade according to example 1 of the present invention.

Referring to FIGS. 4, 5 and 6, a stirring blade according to the present invention comprises an upper blade assembly A and a lower blade assembly B. The upper blade assembly A comprises a first four-edged blade 2 and an upper blade carrier 3 to which the first four-edged blade 2 is fixed. The lower blade assembly B comprises a second four-edged blade 4 and an lower blade carrier 1 to which the second four-edged blade 4 is fixed. The upper blade carrier 3 is connected to the lower blade carrier 1 by a detachable connecting structure.

In the present example, to facilitate the connection, the upper blade carrier 3 is provided with a through hole 31, the inner wall of which is provided with a positioning groove 32. The lower blade carrier 1 is a shaft-shaped structure, the outer sidewall of which is provided with a positioning pin 11. The upper end of the lower blade carrier 1 is inserted into the through hole 31 provided on the upper blade carrier 3, and the positioning pin 11 provided on the lower blade carrier 1 is positioned by cooperating with the positioning groove 32 provided on the upper blade carrier 3.

Alternatively, the upper blade carrier 3 is provided with a positioning pin, and the lower blade carrier 1 is provided with a positioning groove. The upper end of the lower blade carrier 1 is inserted into the through hole 31 provided on the upper blade carrier 3, and the positioning pin provided on the upper blade carrier 3 is positioned by cooperating with the positioning groove provided on the lower blade carrier 1.

Alternatively, the upper blade carrier 3 is a shaft-shaped structure, which is inserted into a through hole provided on the lower blade carrier 1 and is positioned through a positioning pin or a positioning block cooperating with a positioning groove.

In the present example, the first four-edged blade 2 comprises a upper blade 21, a lower blade 22, a left blade 23, a right blade 24, and a blade carrier 25. The upper blade 21 and the lower blade 22 are respectively provided at opposite sides of the blade carrier 25, and respectively located at the upper side and the lower side of the blade carrier 25. The left blade 23 and the right blade 24 are respectively provided at another opposite sides of the blade carrier 25. Moreover, the edges of the left blade 23 and/or the right blade 24 are not in the same plane with the edges of the upper blade 21 and/or the lower blade 22. The second four-edged blade 4 has the same structure with the first four-edged blade 2.

In the present example, the upper blade 21, the blade carrier 25, and the lower blade 22 are formed as a Z-shaped structure.

The left blade 23 and the right blade 24 are bent upward or downward. In the present example, the left blade 23 and the right blade 24 are bent upward.

In the present example, the joint 251 between the left blade 23 and the blade carrier 25, the joint 252 between the right blade 24 and the blade carrier 25, and the joint 253 between the upper blade 21 and the blade carrier 25 are in the same plane.

In addition, the upper blade 21, the lower blade 22, the left blade 23, and the right blade 24 can be manufactured individually and then be connected to the blade carrier 25. Alternatively, the upper blade 21, the lower blade 22, the left blade 23, the right blade 24, and the blade carrier 25 can be manufactured as a single piece. Alternatively, the upper blade 21 and the lower blade 22 can be manufactured individually and then be connected to the blade carrier 25, while the left blade 23, the right blade 24, and the blade carrier 25 can be manufactured as a single piece. Alternatively, the left blade 23 and the right blade 24 can be manufactured individually and then be connected to the blade carrier 25, while the upper blade 21, the lower blade 22, and the blade carrier 25 can be manufactured as a single piece.

EXAMPLE 2

Figure 7:
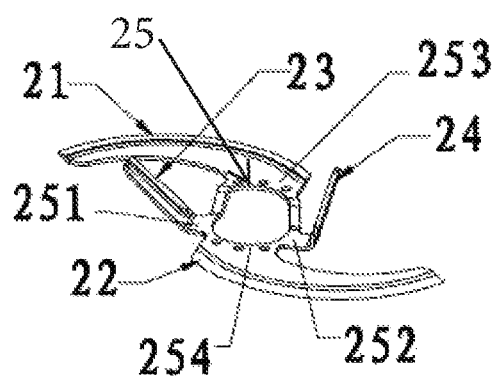
FIG. 7 schematically shows a four-edged blade according to example 2 of the present invention.

Referring to FIG. 7, the stirring blade in the present example is similar to that in example 1, except that the joint 251 between the left blade 23 and the blade carrier 25, the joint 252 between the right blade 24 and the blade carrier 25, and the joint 254 between the lower blade 22 and the blade carrier 25 are in the same plane.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. A stirring blade assembly, comprising:
    an upper blade assembly, the upper blade assembly comprising a first four-edged blade and an upper blade carrier to which the first four-edged blade is fixed; and
    a lower blade assembly, the lower blade assembly comprising a second four-edged blade and a lower blade carrier to which the second four-edged blade is fixed,
    wherein the upper blade carrier is connected to the lower blade carrier by a detachable connecting structure,
    wherein the first four-edged blade comprises an upper blade, a lower blade, a left blade, a right blade and a blade carrier,
    wherein the upper blade and the lower blade are respectively provided at opposite sides of the blade carrier, and are respectively located at an upper side and an lower side of the blade carrier,
    wherein the left blade and the right blade are respectively provided at another opposite sides of the blade carrier, edges of the left blade and/or the right blade and edges of the upper blade and/or the lower blade being not in a same plane, and
    wherein the second four-edged blade comprises an upper blade, a lower blade, a left blade, a right blade and a blade carrier.

2. The stirring blade assembly of claim 1, wherein the upper blade carrier is provided with a through hole, an inner wall of the through hole being provided with a positioning groove, wherein the lower blade carrier is a shaft-shaped structure, an outer wall of the lower blade carrier being provided with a positioning pin, and wherein an upper end of the lower blade carrier is inserted into the through hole provided on the upper blade carrier, such that the positioning pin provided on the lower blade carrier is positioned by cooperating with the positioning groove provided on the upper blade carrier.

3. The stirring blade assembly of claim 1, wherein the upper blade, the blade carrier, and the lower blade are Z-shaped.

4. The stirring blade assembly of claim 1, wherein the left blade and the right blade extend upward or downward.

5. The stirring blade assembly of claim 1, wherein a joint formed by the left blade and the blade carrier, a joint formed by the right blade and the blade carrier, and a joint formed by the upper blade and the blade carrier are in a same plane.

6. The stirring blade assembly of claim 1, wherein a joint formed by the left blade and the blade carrier, a joint formed by the right blade and the blade carrier, and a joint formed by the lower blade and the blade carrier are in a same plane.

\* \* \* \* \*